US009827692B2

(12) United States Patent
Selvasankar

(10) Patent No.: US 9,827,692 B2
(45) Date of Patent: Nov. 28, 2017

(54) EXTRUDER SCREW

(71) Applicant: battenfeld-cincinnati Austria GmbH, Vienna (AT)

(72) Inventor: Ramesh Kumar Selvasankar, Vienna (AT)

(73) Assignee: BATTENFELD-CINCINNATI AUSTRIA GMBH, Vienna (AT)

( * ) Notice: Subject to any disclaimer, the term of this patent is extended or adjusted under 35 U.S.C. 154(b) by 143 days.

(21) Appl. No.: 14/867,036

(22) Filed: Sep. 28, 2015

(65) Prior Publication Data

US 2016/0089814 A1    Mar. 31, 2016

(30) Foreign Application Priority Data

Sep. 29, 2014    (DE) .................. 10 2014 219 706

(51) Int. Cl.
*B29B 7/48*     (2006.01)
*B29C 47/40*    (2006.01)
*B29C 47/60*    (2006.01)

(52) U.S. Cl.
CPC .............. *B29B 7/48* (2013.01); *B29C 47/402* (2013.01); *B29C 47/6075* (2013.01); *B29C 47/6081* (2013.01)

(58) Field of Classification Search
CPC ........................................................ B29B 7/48
USPC .................................. 366/85, 301; 425/204
See application file for complete search history.

(56) References Cited

U.S. PATENT DOCUMENTS

| | | | | |
|---|---|---|---|---|
| 2,434,707 A | * | 1/1948 | Marshall | A01J 17/00 |
| | | | | 159/2.2 |
| 2,674,104 A | * | 4/1954 | Street | F28F 13/12 |
| | | | | 366/149 |
| 3,900,187 A | * | 8/1975 | Loomans | B29B 7/489 |
| | | | | 366/85 |
| 4,300,839 A | * | 11/1981 | Sakagami | B29C 47/0861 |
| | | | | 366/85 |
| 5,350,231 A | | 9/1994 | Eigruber | |

FOREIGN PATENT DOCUMENTS

| | | |
|---|---|---|
| DE | 2911834 A1 | 10/1979 |
| DE | 4236496 A1 | 5/1994 |
| DE | 19839374 A1 | 3/2000 |

* cited by examiner

*Primary Examiner* — David Sorkin
(74) *Attorney, Agent, or Firm* — Leydig, Voit & Mayer, Ltd.

(57) ABSTRACT

A double-screw extruder for thermoplastic materials, with a first and a second extruder screw, whereby the extruder screws have an inlet and an outlet and a core, helically extending screw flights being arranged through the core from the inlet to the outlet, so that the screw peaks and valleys are circumferential, and the peaks of the first screw penetrate into the valleys of the second screw, and vice versa. The screw flights may have a geometry which is step-shaped in cross section, whereby the steps may be provided such that the stepped course of the peaks is congruent with the stepped course of the valleys.

10 Claims, 6 Drawing Sheets

EXTRUDER SCREW

CROSS-REFERENCE TO RELATED APPLICATIONS

Priority is claimed to German Patent Application No. DE 10 2014 219 706.6, filed on Sep. 29, 2014, the entire disclosure of which is hereby incorporated by reference herein.

FIELD

The invention relates to a twin screw extruder for thermoplastic materials, comprising a first and a second extruder screw, the extruder screws having an inlet end and an outlet end and a core, helically extending screw flights being arranged over the core from the inlet end to the outlet end such that peaks and valleys are produced on the circumference of the screws, the peaks of the first screw engaging in the valleys of the second screw and vice versa.

To melt the granular plastics material, said material is first pressed between the flights of the meshing screws of a twin screw extruder. The clearances formed by the engagement of the screws cause significant shearing, plasticizing and homogenization of the plastics melt.

From the prior art, DE 29 11 834 A1 is known, in which the principle of meshing twin screws can be seen. Meshing twin screws are also disclosed in DE 42 36 496 A1 and DE 198 39 374 A1.

The surface area produced on the flights for pressing the granular material is significant in this case. In the intermeshing zone, one flight of the counter-screw penetrates the threads of the first screw and forms an inter-screw clearance at the narrowest point. These clearances and the surface area of the screw influence the plasticizing performance of the screw.

SUMMARY

An aspect of the invention provides a twin screw extruder for a thermoplastic material, the extruder comprising: a first extruder screw; and a second extruder screw, wherein the first and second extruder screws each include an inlet end, an outlet end, and a core, wherein helically extending screw flights are arranged over the core from the inlet end to the outlet end such that peaks and valleys of each of the first and second screws are produced on the circumference of the screws, wherein the peaks of the first screw engage in the valleys of the second screw and vice versa, wherein the screw flights have a geometry which has a stepped cross section, wherein steps of the screws are configured such that a stepped course of the peaks is congruent with a stepped course of the valleys.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

An aspect of the invention provides a twin screw extruder for thermoplastic materials, comprising a first and a second extruder screw, the extruder screws having an inlet end and an outlet end and a core, helically extending screw flights being arranged over the core from the inlet end to the outlet end such that peaks and valleys are produced on the circumference of the screws, the peaks of the first screw engaging in the valleys of the second screw and vice versa.

An aspect of the invention develops a known screw geometry such that as large a surface area as possible prevails on the flights and thus on the overall surface area of the screw. In addition, an aspect of the invention minimizes screw wear.

An aspect of the invention provides that the screw flights have a geometry which is stepped in cross section, the steps being designed such that a stepped course of the peaks is congruent with a stepped course of the valleys. This design according to an aspect of the invention of the screw flights increases the surface area of the extruder screw.

The screws thus may comprise an inlet end and an outlet end and an elongate core having a screw flight which extends helically and projects outwards, the flights (peaks) of one screw engaging in the chambers/channels (valleys) between the flights of the other screw.

According to an aspect of the invention, a gap is produced as a result of the first extruder screw engaging in the second extruder screw. The step-like construction increases the number of gaps, as a result of which the plasticization of the material is improved. The plurality of spaces leads to a greater leakage flow, which makes the mixing more efficient.

Advantageously, the width of the gap can vary between 0.5 mm and 3 mm and can be different at each level. This allows the stepped course of the steps to have a very variable design. This flexibility in the design means, for example, that the gap at the flanks is different from the gap at the ridge of the screw flights.

In a further development, the number of levels of the step includes two or three levels depending on the width of the screw flight.

Additional advantageous developments are set out in the dependent claims.

Figure 1:
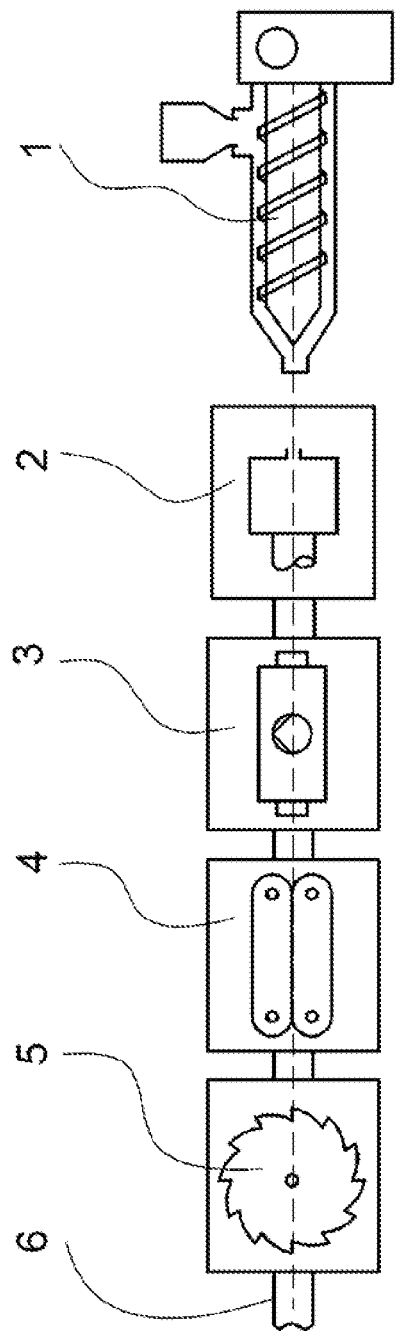
FIG. 1 shows a typical extrusion line.

FIG. 1 shows a typical extrusion line as used currently for profile extrusion, regardless of whether said line is used for producing window profiles or tubes. The figure shows an extruder 1, in which plastics material is melted and continuously conveyed into the extrusion die 2 to be shaped. The die is followed by a calibrating and cooling station 3; depending on the profile, further cooling stations can be used. Downstream of the cooling stations is a take-off device 4. A cutting device 5 is arranged thereafter for cutting the continuous profiles 6 to the desired length.

Figure 2:
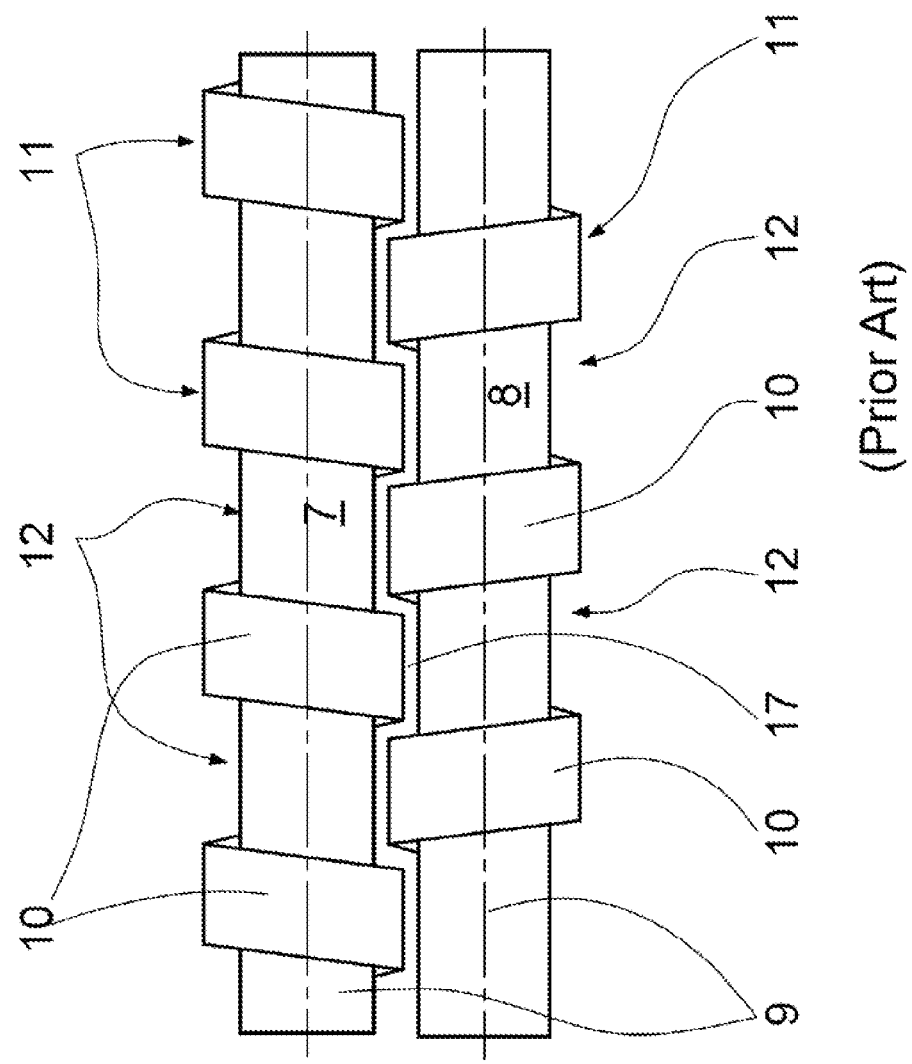
FIG. 2 shows a detail of two meshing extruder screws.
Figure 4:
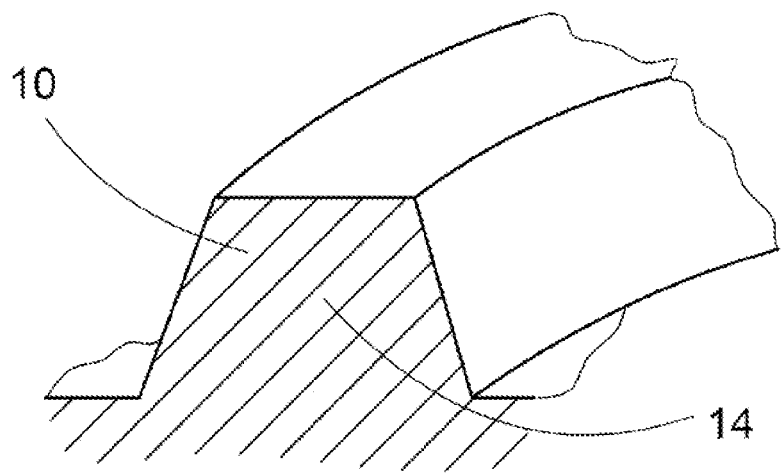
FIG. 4 shows a 3D section of a screw flight.
Figure 5:
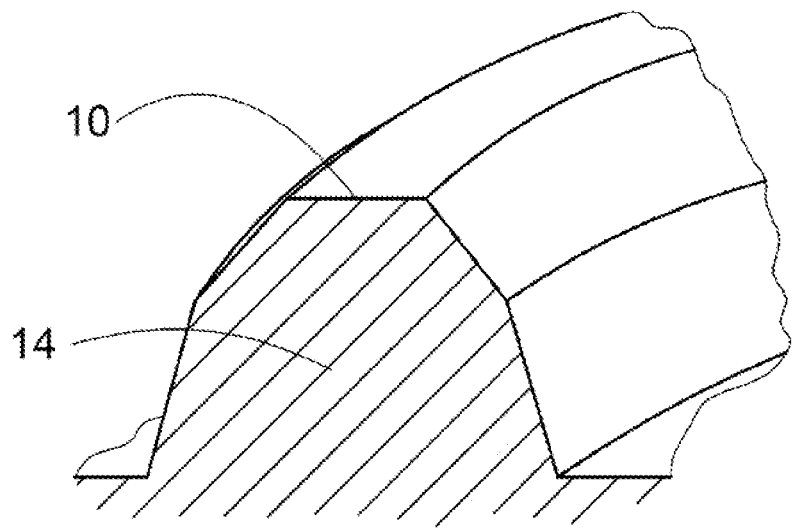
FIG. 5 shows a 3D section of an alternative screw flight.

FIG. 2 is a schematic view of a detail of two meshing extruder screws. A first extruder screw 7 and a second extruder screw 8 are arranged next to one another such that screw flights 10 in the form of peaks 11 engage in the valleys 12 of the adjacent screw, without the screws touching. A gap 17 is present between the two screws. The shape of the screw flights 10, which extend along the core 7 from an inlet end to an outlet end, can be trapezoidal in cross section, as shown in FIG. 5, or trapezoidal with a chamfer, as shown in FIG. 4. The design according to FIGS. 2, 4 and 5 indicates the prior art.

Figure 3:
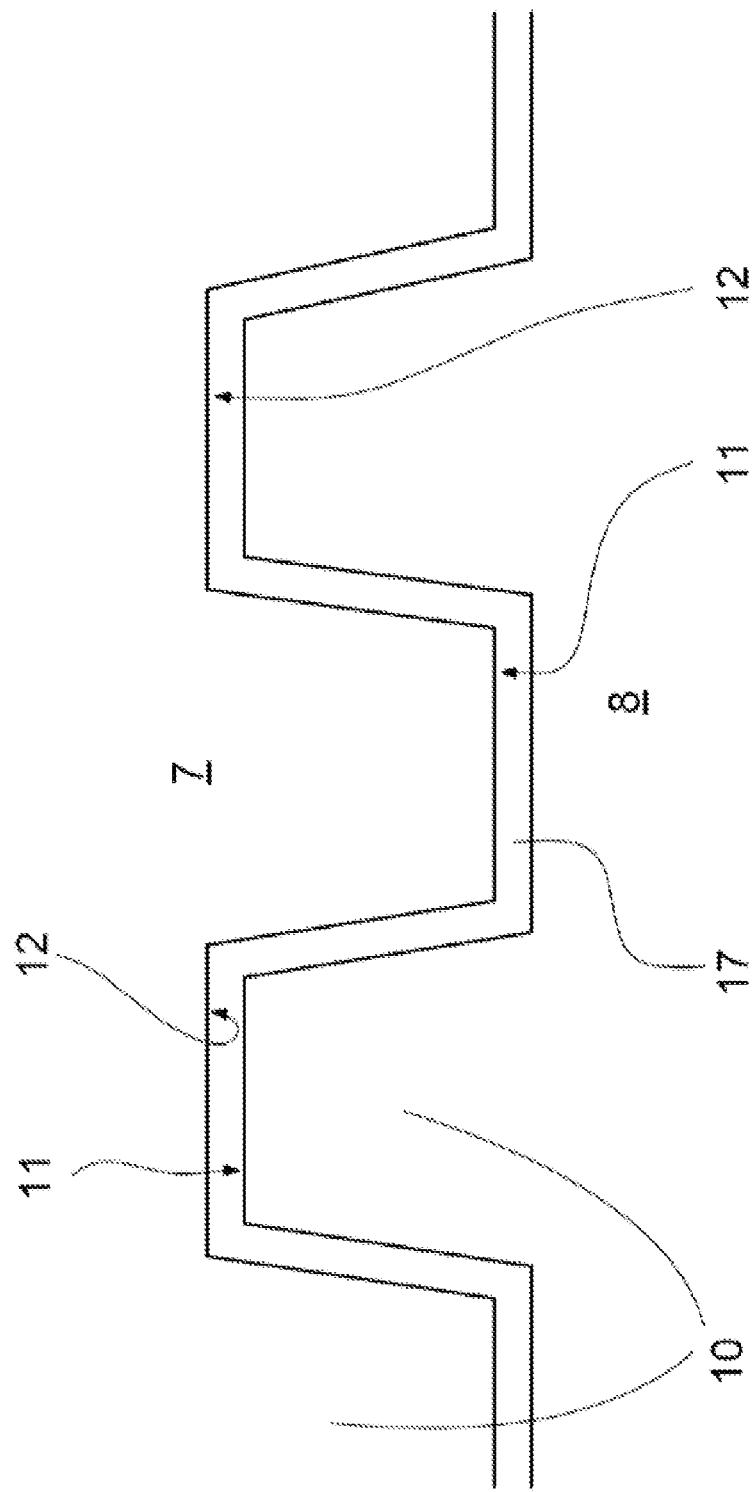
FIG. 3 is a section through the screws according to FIG. 2.

This is shown again in an enlarged view in FIG. 3. The first extruder screw 7 and the second extruder screw 8 have trapezoidal screw flights 10, as a result of which peaks 11 and the valleys 12 are produced on the circumference of the screw. The extruder screws mesh next to one another in such a way that they do not touch and a gap 17 remains therebetween. FIG. 3 thus also shows the prior art.

As mentioned above, FIGS. 4 and 5 show two typical cross sections of the screw flights 10 by way of example.

Figure 6:
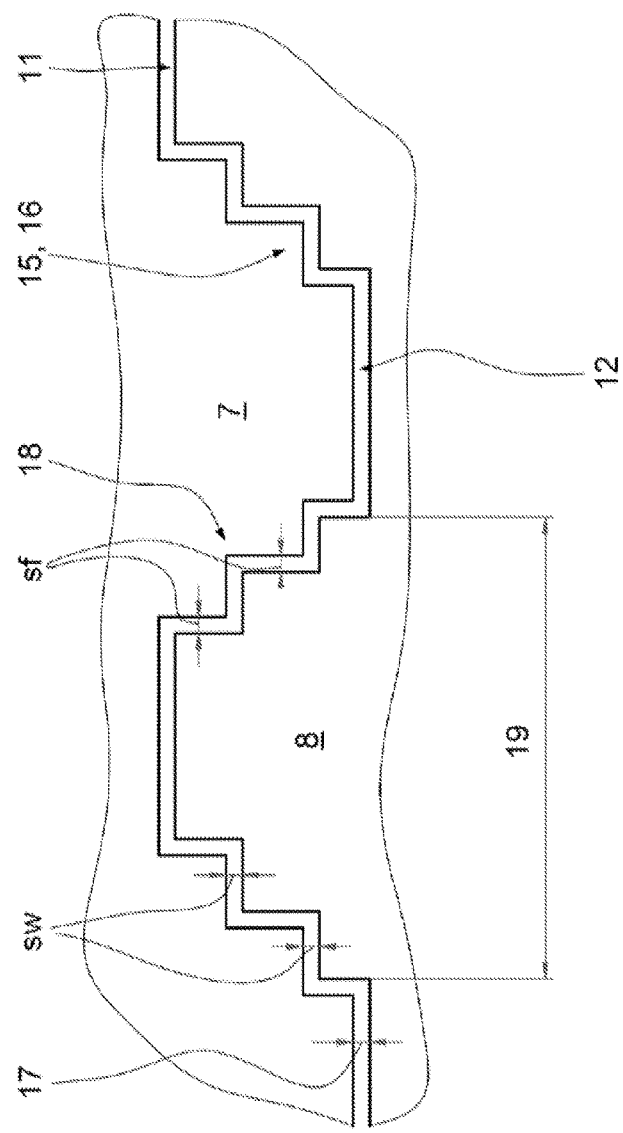
FIG. 6 shows a detail of two meshing extruder screws according to the invention.

FIG. 6 shows a detail, similar to FIG. 2, of the design according to the invention of the screw flights 10. Both the first extruder screw 7 and the second extruder screw 8 have a screw flight 10. Owing to this screw flight 10, peaks 11 and valleys 12 are produced on the circumference of the screw.

In this case, however, the flanks of the flights are now step-like unlike in the prior art. The stepped course 16 of the steps 15 of the first extruder screw 7 is congruent with the stepped course 16 of the second extruder screw 8. This ensures that the raised portion, i.e. the peak 11, of one extruder screw fits into the depression or recess, i.e. the valley 12, of the other extruder screw, without said screws touching. There is always a gap 17 between the two screws. Depending on the width 19 of the screw flight 10, the step 15 has two or three levels 18.

By way of example, FIG. 6 shows three levels 18 per step 15. The gap 17 from the adjacent extruder screw is denoted by sf on the flanks and by sw on the ridges. The gap 17 can differ from level to level, from flank to flank, and from flank to ridge. Thus, sf1 can be different from sf2, from sf3 and of course from sw too, but also sw1 can be different from sw2 and sw3.

Figure 7:
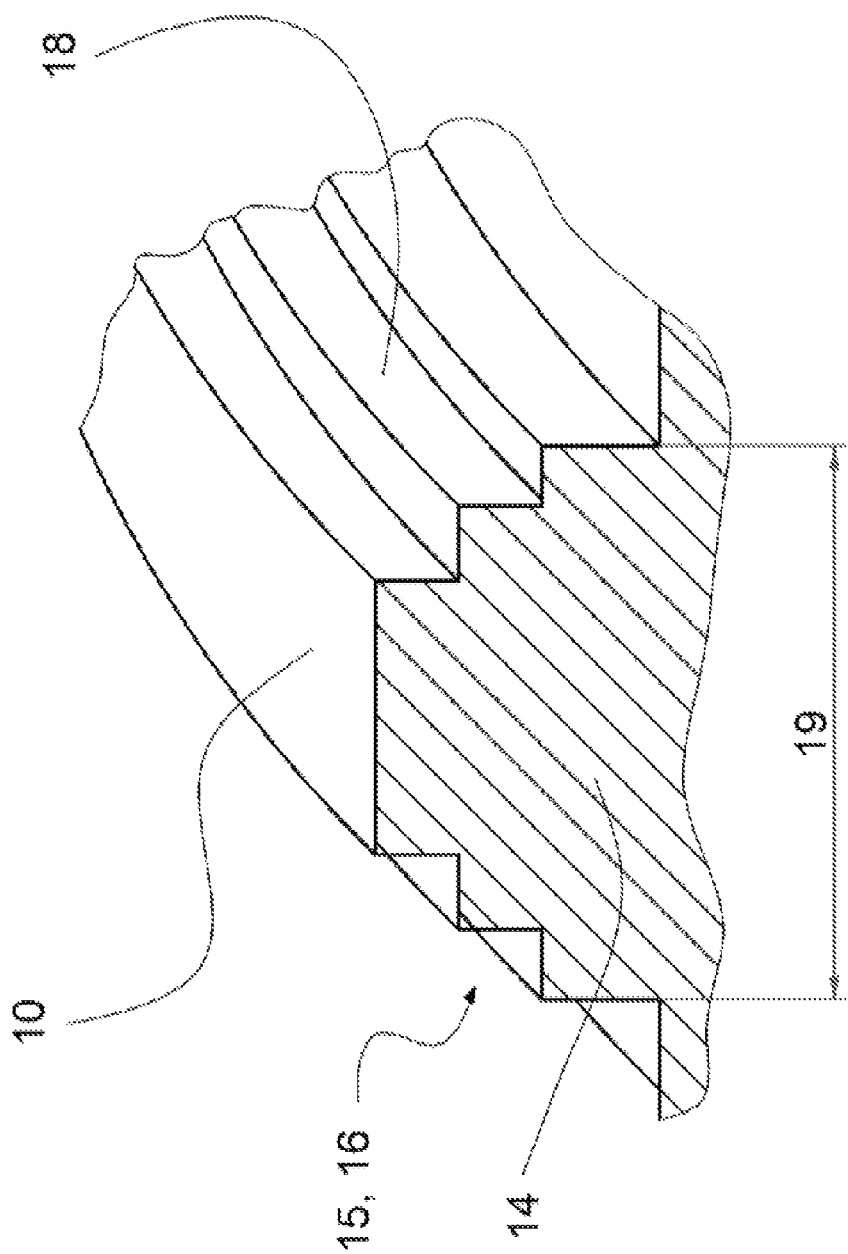
FIG. 7 shows a 3D section of a screw flight according to the invention.

The screw flight 10 according to the invention shown in FIG. 7 shows the stepped design having the cross section 14, the step 15, the levels 18 and the width 19 of the screw flight 10. For the purpose of illustration, the screw flight 10 is shown in a 3D view.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B, and C" should be interpreted as one or more of a group of elements consisting of A, B, and C, and should not be interpreted as requiring at least one of each of the listed elements A, B, and C, regardless of whether A, B, and C are related as categories or otherwise. Moreover, the recitation of "A, B, and/or C" or "at least one of A, B, or C" should be interpreted as including any singular entity from the listed elements, e.g., A, any subset from the listed elements, e.g., A and B, or the entire list of elements A, B, and C.

LIST OF REFERENCE SIGNS

1 Extruder
2 Extrusion die
3 Calibrating and cooling tank
4 Take-off device
5 Cutting device
6 Profile
7 First extruder screw
8 Second extruder screw
9 Core of 7 or 8
10 Screw flights of 7 or 8
11 Peaks of 7 or 8
12 Valleys of 7 or 8
13 Geometry of 10
14 Cross section of 10
15 Step of 10
16 Stepped course of 15
17 Gap between 7 and 8
18 Level of 15
19 Width of 10
sw 17 on the ridge of 10
sf 17 on the flank of 10

The invention claimed is:

1. A twin screw extruder for a thermoplastic material, the extruder comprising:
a first extruder screw; and
a second extruder screw,
wherein the first and second extruder screws each include an inlet end, an outlet end, and a core,
wherein helically extending screw flights are arranged over each core from the inlet end to the outlet end so as to provide peaks and valleys on a circumference of each of the first and second extruder screws,
wherein the peaks of the helically extending screw flight of the first extruder screw engage in the valleys of the helically extending screw flight of the second extruder screw and vice versa,
wherein the helically extending screw flights have a stepped cross section providing a plurality of steps, each step comprising a plurality of flanks and a plurality of ridges, each step, when viewed in cross section, including at least two levels,
wherein the steps of the first and second extruder screws are configured such that a stepped course of the peaks is congruent with a stepped course of the valleys,
wherein a gap is produced between the first and second extruder screws as a result of the first extruder screw engaging in the second extruder screw, and
wherein an extent of the gap differs at each level of the at least two levels.

2. The extruder of claim 1, wherein the extent of the gap varies between 0.5 mm and 3 mm.

3. The extruder of claim 1, wherein an the extent of the gap on the flanks of the helically extending screw flights is different from an extent of the gap on the ridges of the helically extending screw flights.

4. The extruder of claim 2, wherein an extent of the gap on the flanks of the helically extending screw flights is different from an extent of the gap on the ridges of the helically extending screw flights.

5. The extruder of claim 1, wherein the at least two levels comprise two levels or three levels, depending on a width of the helically extending screw flight.

6. The extruder of claim 1, wherein the at least two levels comprise no more than two levels.

7. The extruder of claim 1, wherein the at least two levels comprise three levels.

8. The extruder of claim 1, wherein, for each step, the ridge is perpendicular to the flank.

9. The extruder of claim 1, wherein an extent of the gap on a first flank of a step of at least one of the helically extending screw flights is different from an extent of the gap on a second flank of the same step.

10. The extruder of claim 2, wherein an extent of the gap on a first flank of a step of at least one of the helically extending screw flights is different from an extent of the gap on a second flank of the same step.

* * * * *